United States Patent
Poledna

(10) Patent No.: US 9,614,744 B2
(45) Date of Patent: Apr. 4, 2017

(54) METHOD FOR MONITORING, AT THE CORRECT TIME, TT ETHERNET MESSAGES

(71) Applicant: FTS Computertechnik GmbH, Vienna (AT)

(72) Inventor: Stefan Poledna, Klosterneuburg (AT)

(73) Assignee: FTS Computertechnik GmbH, Wien (AT)

( * ) Notice: Subject to any disclaimer, the term of this patent is extended or adjusted under 35 U.S.C. 154(b) by 66 days.

(21) Appl. No.: 14/362,388

(22) PCT Filed: Dec. 18, 2012

(86) PCT No.: PCT/AT2012/050198
§ 371 (c)(1),
(2) Date: Jun. 2, 2014

(87) PCT Pub. No.: WO2013/090963
PCT Pub. Date: Jun. 27, 2013

(65) Prior Publication Data
US 2015/0043360 A1  Feb. 12, 2015

(30) Foreign Application Priority Data
Dec. 19, 2011 (AT) ................... A1842/2011

(51) Int. Cl.
*H04L 12/26* (2006.01)
*H04L 12/43* (2006.01)

(52) U.S. Cl.
CPC ............ *H04L 43/106* (2013.01); *H04L 12/43* (2013.01); *H04L 43/026* (2013.01); *H04L 43/0858* (2013.01)

(58) Field of Classification Search
None
See application file for complete search history.

(56) References Cited

U.S. PATENT DOCUMENTS 5,793,753 A   8/1998  Hershey et al.
7,839,868 B2  11/2010 Kopetz
(Continued)

FOREIGN PATENT DOCUMENTS

EP   1909422 A2    4/2008
WO   2004030275 A1  4/2004
WO   2011123877 A1  10/2011

OTHER PUBLICATIONS

International Search Report for International Application No. PCT/AT2012/050198, International Filing Date Dec. 18, 2012, Search Completed Feb. 26, 2013, Mailed Mar. 5, 2013, 2 pgs.

(Continued)

*Primary Examiner* — Kouroush Mohebbi
(74) *Attorney, Agent, or Firm* — KPPB LLP

(57) ABSTRACT

The invention relates to a method for monitoring, at the correct time, TTEthernet (TT) messages communicated by a TTEthernet switch (TTE switch) in a distributed real-time computer system. According to the invention, the TTE switch has a global time having precision P and accuracy A, and the TTE switch has a plurality of communication channels and one or more monitoring channels, and the TTE switch contains a selection data structure that specifies which TT message classes are to be monitored, and a copy of a TT message which belongs to a TT message class selected for monitoring is formed in the TTE switch and is transmitted by the TTE switch via a monitoring channel to a monitoring node, and the TTE switch subsequently autonomously transmits an ET message containing an identifier and the exact transmission time of the monitored TT message via a monitoring channel to a monitoring node.

19 Claims, 1 Drawing Sheet

(56) References Cited

U.S. PATENT DOCUMENTS

| | | |
|---|---|---|
| 8,004,993 B2 | 8/2011 | Angelow |
| 2005/0094674 A1 | 5/2005 | Zinke et al. |
| 2005/0117596 A1* | 6/2005 | Kopetz ................ H04J 3/0655 370/401 |
| 2008/0072035 A1* | 3/2008 | Johnson .............. H04L 63/0428 713/153 |
| 2009/0018806 A1 | 1/2009 | Butterfield et al. |
| 2011/0307741 A1 | 12/2011 | Chen et al. |
| 2012/0300795 A1* | 11/2012 | Joergensen ........... H04J 3/0667 370/503 |

OTHER PUBLICATIONS

SAE Standard con TT Ethernet, Retrieved from: http://standards.sae.org/as6802/, Published Nov. 1, 2011.

Hmelo-Silver et al., "Comparing Expert and Novice Understanding of a Complex System from the Perspective of Structures, Behaviors and Functions", Cognitive Science, Elsevier, 2004, vol. 28, pp. 127-138.

Kopetz, "Real-Time Systems, Design Principles for Distributed Embedded Applications", Springer Verlag, 2011.

* cited by examiner

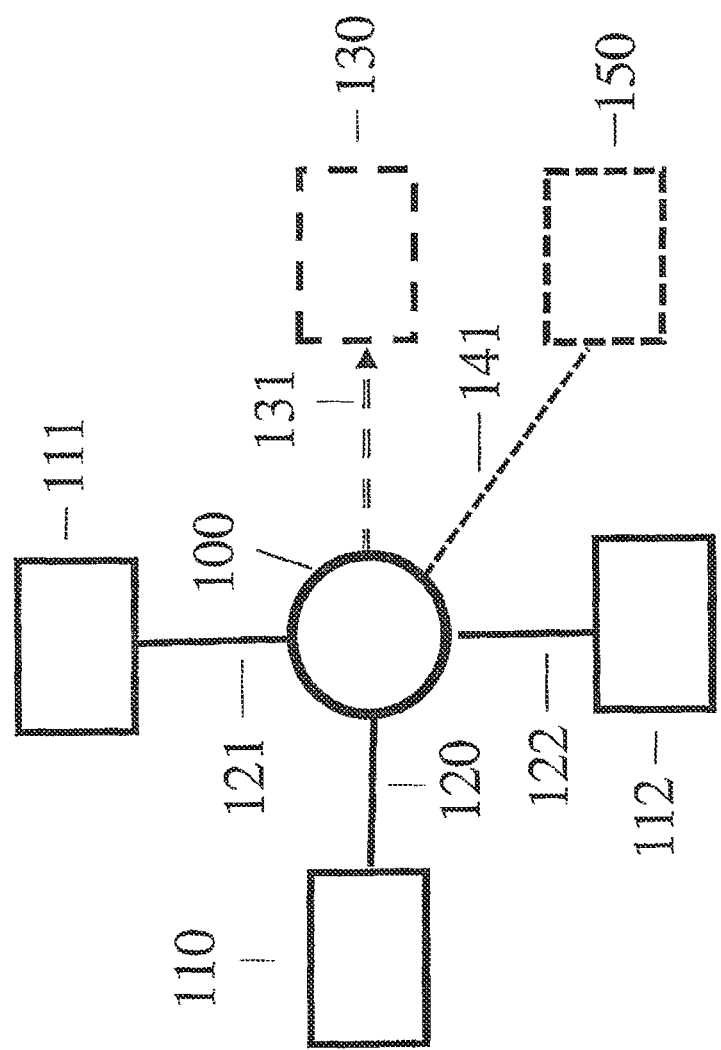

METHOD FOR MONITORING, AT THE CORRECT TIME, TT ETHERNET MESSAGES

CROSS REFERENCED APPLICATION

This application is a 35 U.S.C. §371 filing of PCT Application PCT/AT2012/050198 filed Dec. 18, 2012 which claims priority to Austrian Patent Application A1842/2011 filed Dec. 19, 2011 both of which are hereby incorporated by reference.

FIELD OF THE INVENTION

The invention pertains to a method for the time-correct monitoring of Time Triggered Ethernet (TT) messages transmitted by a Time Triggered Ethernet Switch (TTE Switch) in a distributed real-time computer system.

SUMMARY OF THE INVENTION

The invention furthermore pertains to a TTEthernet switch (TTE switch) for a distributed real-time computer system, wherein the real-time computer system consists of a plurality of node computers and TTE switches, and wherein the TTE switch transmits TTEthernet (TT) messages within the real-time computer system.

The invention furthermore pertains to such a real-time computer system.

In a distributed real-time system composed of a plurality of node computers communicating exclusively via messages, the interface response of a node computer can be described by the interpreted messages being received and transmitted at this interface. It is therefore advantageous if all messages occurring at an interface can be monitored at the appropriate time without affecting the time response of the system (on-intrusive observation) as indicated in US Pat Application 2011/0307741 in the name of Chen entitled "Non-intrusive debugging framework for parallel software based on super multi-core". Experience indicates that a non-observable flow of information between the subsystems of a large system increases the cognitive effort required to understand the function of a system and to detect malfunctions as indicated in the article by Hmelo-Silver, C. E. & M. G. Pfeffer entitled "Comparing Expert and Novice Understanding of a Complex System from the Perspective of Structures, Behaviors, and Functions" Cognitive Science, Elsevier, Vol. 28. (pp. 127-138) 2004.

One objective of the invention is to disclose a method as well as hardware, with which in a distributed real-time system in which the node computers communicate via Ethernet messages in a Time-Triggered Ethernet system (TTEthernet), the occurring messages can be monitored at the correct time without affecting the timing behavior of the system. The TTEthernet is thereby subject of U.S. Pat. No. 7,839,868 entitled "Communication method and system for the transmission of time-driven and event-driven Ethernet messages" issued to Kopetz issued Nov. 23, 2010 and U.S. Pat. No. 7,979,247 issued to Angelow, et al. and entitled "Multirouter for time-controlled communication system" on Aug. 23, 2011. The Society of Automotive Engineer's Time Trigger Ethernet (SAE TTEthernet) standard is available on URL: http://standards.sae.org/as6802.

In a conventional Ethernet system, the time-correct monitoring of the messages is difficult due to the fact that messages may be delayed in the buffers of the Ethernet switches and that the exact moments in time, at which a message is forwarded, cannot be predicted. In a time-triggered system, in which major actions are derived from the progression of a global time, the timing response is predictable. One necessary precondition for the correct response of a time-triggered system is the availability of a global time in all subsystems of the system. The quality of the global time is expressed by the precision of the time, such as explained in detail in page 55 of "Real-Time Systems, Design Principles for Distributed Embedded Applications", Kopetz, Springer Verlag, 2011. In a large system it is advantageous for the global time to be synchronized to the external time standard, International Atome Time (TAI) as distributed by the Global Positioning System (GPS) signal, for example. The quality of the external synchronization is expressed by the accuracy (A).

The present invention achieves the above-named objective by providing according to the invention that the TTE switch exhibits a global time with the precision P and the accuracy A, and wherein the TTE switch is equipped with a plurality of communication channels and one or multiple monitoring channels, and wherein the TTE switch contains a selection data structure indicating the TT message classes to be monitored, and wherein a copy of a TT message belonging to a message class selected for monitoring is generated inside the TTE switch and sent by the TTE switch via a monitoring channel to a monitoring node, and wherein the TTE switch subsequently autonomously sends an ET message containing an identifier and the exact time of transmission of the monitored TT message via a monitoring channel to a monitoring node.

The method disclosed herein (as well as the switch according to the invention) provides for a Time-Triggered Ethernet (TTE) switch to copy a message that has been selected for monitoring and to send it via a monitoring channel to a monitoring node. Since the copied message may be delayed before being sent via the monitoring channel and the time of transmission of the copied message to the monitoring node does not match the time at which the TT message selected for monitoring was forwarded to the recipient, the TTE switch sends immediately after having sent the copied message an additional message containing a message identifier of the copied message and a time stamp showing the time the selected monitoring message was sent to the recipient indicated in the message. The TTE switch generates this additional message autonomously. As a result, a monitoring node is able to sort all of the messages selected for monitoring and received from the various TTE switches in precise chronological order.

The problem of monitoring messages being exchanged between the subsystems of a large system is the subject of several patents. U.S. Pat. No. 5,793,753 issued to Hershey, et al. entitled "Telecommunications network management observation and response system", issued Aug. 11, 1998, for example, discloses a method allowing the monitoring of message traffic in a large telecommunication system without affecting the timing of the message traffic (prevention of the probe effect). The problem of monitoring at the correct time is not addressed. U.S. Patent Publication 2011/0307741 entitled "Non-intrusive debugging framework for parallel software based on super multi-core" in the name of Chen discloses a comprehensive monitoring and debugging system in a multicore system on chip. The innovation in this system is also the prevention of the probe effect. Subject of U.S. Patent Publication 2005/0094674 entitled "Method and circuit arrangement for the monitoring and management of data traffic in a communication system with several communication nodes" in the name of Zinke et al. is the monitoring of the message traffic in a bus system. In a bus system, the problem addressed in the present patent specification does not apply since the bus is not able to store messages.

The present invention discloses a method for the implementation of the time-correct monitoring of Ethernet messages in a large distributed real-time system. In order to eliminate the unpredictable delay of messages in the memories of an Ethernet switch, the switch generates in addition to the message that has been selected for monitoring another message indicating the exact time at which the monitored message has left the Ethernet switch.

Additional advantageous embodiments of the method according to the invention and the switch according to the invention are described below:

It is advantageous for the ET message generated autonomously by the TTE switch to be transmitted after a multiplicity (plurality) of TT messages selected for monitoring, with the data field of the ET message containing the identifiers and the exact times of transmission of all TT messages comprising the multiplicity.

It may be expedient for the selection data structure to be loaded into the TTE switch dynamically.

It may also be advantageous for any change of the selection data structure to be protected by cryptographic protocols.

It is furthermore advantageous if in addition to the TT messages, ET messages transmitted by the TTE switch can be selected for monitoring as well.

It is expedient for the monitoring channel to support a higher bandwidth than the communication channels.

It may be beneficial for all time-derived transmission events to be sparse events.

Finally, it is advantageous for each TT message to contain a parameter field, to which the value of TRUE or FALSE is assigned by a sender of the message and whereby a message, in which the parameter field contains the TRUE value, is copied by the TTE switch and sent to the monitoring channel, and whereby a message in the parameter field containing the FALSE value is not sent to the monitoring channel.

BRIEF DESCRIPTION OF THE DRAWINGS

The present invention is explained with reference to the following drawing FIG. 1. This drawing shows the structure of a distributed real-time system with three processing nodes, one monitoring node and one configuration node.

The distributed real-time computer system represented in FIG. 1 is composed of the three node computers 110, 111, 112 which are connected to the TTE switch 100 via the three communication channels 120, 121, 122. The monitoring channel 131 links the TTE switch 100 to the monitoring node 130. The communication channel 141 links the TTE switch 100 to the configuration node 150.

Contained in the TTE switch 100 is a selection data structure specifying the TT (time-triggered) message classes to be monitored. A TT message class is created by a sequence of periodic time-triggered messages with an identical structure. A TT message class can be identified by its scheduled period and its offset. A single message of a TT message class can be identified by the scheduled time of transmission. Alternatively, each individual TT message can be identified by the header of the TTEthernet message and the time of transmission.

The selection data structure in the TTE Switch 100 can be changed dynamically from the configuration node 150. In order to ensure the authenticity and integrity of such change, the data traffic between the node 150 and the TTE switch 100 can be secured by known cryptographic protocols (see for example "Real-Time Systems, Design Principles for Distributed Embedded Applications", Kopetz, Springer Verlag, 2011, p. 141).

In a large distributed real-time system, a plurality of node computers can exchange messages via a plurality of TTE switches. Since all TTE switches are equipped with a global time base with the precision P and the accuracy A, it is possible to globally sort the time stamps generated by the various TTE switches. If the transmission events represent sparse events (see Real-Time Systems, Design Principles for Distributed Embedded Applications", Kopetz, Springer Verlag, 2011, p. 62), all messages in the entire system can be sorted consistently.

When many classes of messages in a TTE switch are selected for monitoring, the bandwidth of the monitoring channel may not be sufficient to send all monitored messages to the monitoring node. According to the invention, it is therefore useful to dimension the bandwidth of the monitoring channel broader than the bandwidth of the communication channels. The bandwidth of the communication channels may, for example, be 100 Mbit/sec, the bandwidth of the monitoring channel, however, 1000 Mbit/sec. Alternatively, multiple monitoring channels in one single TTE switch may be configured as well.

The selection data structure in the TTE switch 100 may also contain standard Ethernet messages, i.e. ET (event-triggered) messages, to be monitored. This may also apply to Ethernet messages, which are interpreted according to higher protocol layers like the Aeronautical Radio, Incorporated 664 deterministic Ethernet standard (ARINC 664) or The Institute of Electrical and Electronics Engineers Standard 801.1 that applies to audio/video bridging (IEEE 801.1). These ET messages may be identified, for example, via the header which is part of every Ethernet message. Alternatively, a parameter field may be inserted in the data field of an Ethernet message, with the assigned values of TRUE or FALSE. If the value of this parameter field contains TRUE, the message shall be monitored. If the value of this parameter field contains FALSE, the message shall not be monitored.

The described monitoring method may be implemented in software as well as in a Field-Programmable Gate Array (FPGA) chip or in an Application Specific Integrate Circuit (ASIC) chip directly in the hardware.

The detailed description of the invention above represents only one of many possible options of implementation.

The invention claimed is:

1. A method for the time-correct monitoring of Time Triggered Ethernet (TT) messages transmitted by a Time Triggered Ethernet (TTEthernet switch) in a distributed real-time computer system including at least the TTEthernet switch and a monitoring node where the TTEthernet switch includes a plurality of communication channels and at least one monitoring channel, wherein the TTEthernet switch has a global time with the precision P and the accuracy A, and wherein the TTEthernet switch contains a selection data structure, where the selection data structure indicates each TT message class to be monitored wherein each TT message class is identified by an offset and a scheduled period, the method comprising: detecting a TT message of a TT message class to be monitored in the TTEthernet switch using the selection data structure based on an offset of the TT message and the time of transmission, generating a copy of the TT message in the TTEthernet switch, sending the copy of the TT message from the TTEthernet switch via one of the at least one monitoring channels to a monitoring node, and autonomously sending an Ethernet (ET) message containing an identifier and the exact time of transmission of the TT message via one of the at least one monitoring channels from the TTEthernet switch to a monitoring node subsequent to sending the copy of the TT message.

2. The method according to claim 1 further comprising autonomously generating the ET message in the TTEthernet switch after a plurality of TT messages of TT message classes to be monitored are detected, whereby the data field of the ET message contains identifiers and exact times of transmission of all the plurality of TT messages detected.

3. The method according to claim 1 further comprising dynamically loading the selection data structure into the TTEthernet switch.

4. The Method according to claim 1 further comprising securing a change of the selection data structure by cryptographic protocols.

5. The method according to claim 1 further comprising monitoring and detecting ET messages being transmitted by the TTEthernet switch.

6. The method according to claim 1 where the at least one monitoring channel supports a higher bandwidth than a one of the plurality of communication channels.

7. The method according to claim 1 characterized in that all time-derived transmission events represent sparse events.

8. The method according to claim 1 where the TT message includes a parameter field to which a value of TRUE or FALSE is assigned by a sender, and wherein the method further comprises determining whether the TT message includes a TRUE value or a FALSE value; copying the TT message in response to a determination that parameter field value is TRUE using the TTEthernet switch, sending the copy from the TTEthernet switch to the monitoring node via the at least one monitoring channel, and not sending the copy of the message in response to a determination that the parameter field value of the message is FALSE using the TTEthernet switch.

9. A Time Triggered Ethernet (TTE switch) for a distributed real-time computer system, wherein the distributed real-time computer system includes a plurality of node computers and at least one TTE switch, and wherein the at least one TTE switch transmits Time Triggered Ethernet (TT) messages within the distributed real-time computer system, the TTE switch comprising: equipment for maintaining a global time with the precision P and the accuracy A; a plurality of communication channels; at least one monitoring channel; a memory storing a selection storing data structure indicating each type of TT message to be monitored wherein each TT message class is identified by an offset and a scheduled period; and where the TTE switch is configured to detect a TT message of one of the types of TT messages indicated to be monitored in the selection storing data structure based on an offset of the TT message and the time of transmission, generate a copy of the TT message send the copy of the TT message to a monitoring node in the distributed real-time network via one of the at least one monitoring channels, and subsequently autonomously send an Ethernet (ET) message containing an identifier and exact transmission time of the TT message via one of the at least one monitoring channels to the monitoring node.

10. The TTE switch according to claim 9 where the TTE switch is further configured to autonomously generate the ET message after a plurality of TT messages selected to be monitored are detected, whereby the data field of the ET message includes an identifier and exact time of transmission of each of the plurality of TT messages.

11. The TTE switch according to claim 9 where the TTE switch is further configured to dynamically load the selection data structure into the TTE switch.

12. The TTE switch according to claim 9 where a change of the selection data structure is secured by cryptographic protocols.

13. The TTE switch according to claim 9 where the TTE switch is further configured to monitor ET messages being transmitted by the TTE switch.

14. The TTE switch according to claim 9 where the at least one monitoring channel supports a higher bandwidth than at least one of the plurality of transmission channels.

15. The TTE switch according to claim 9 where all time-derived transmission events represent sparse events.

16. The TTE Switch according to claim 9 where the TT message includes a parameter field having a value of one of TRUE and FALSE is assigned by a sender, and wherein the TTE switch is further configured to send the TT message to the monitoring node via the at least one monitoring channel when the parameter field value is TRUE, and to not transmit the TT message when the parameter field value is FALSE.

17. A real-time computer system, comprising a plurality of node computers and TTE switches, comprising at least one TTE switch according to claim 9.

18. The real-time computer system according to claim 17 a plurality of TTE switches support monitoring channels, whereby the monitoring channels of the plurality of TTE switches are connected to at least one monitoring node.

19. A distributed real-time computer architecture in a distributed real-time computer system according to claim 17 composed of a plurality of node computers and a plurality of TTE switches and in which at least two of the plurality of TTE switches support monitoring channels, and the monitoring channels of the at least two of the plurality of TTE switches are connected to at least one monitoring node.

* * * * *